US011592042B2

(12) United States Patent
Eusterman et al.

(10) Patent No.: US 11,592,042 B2
(45) Date of Patent: Feb. 28, 2023

(54) SYSTEM AND METHOD FOR ASSEMBLY ATTACHMENT

(71) Applicant: Sink Couture LLC, Spring, TX (US)

(72) Inventors: Colleen O. Eusterman, Spring, TX (US); Francois Charles Martin, Cypress, TX (US)

(73) Assignee: Sink Couture LLC, Spring, TX (US)

( * ) Notice: Subject to any disclaimer, the term of this patent is extended or adjusted under 35 U.S.C. 154(b) by 407 days.

(21) Appl. No.: 16/793,852

(22) Filed: Feb. 18, 2020

(65) Prior Publication Data

US 2020/0263713 A1 Aug. 20, 2020

Related U.S. Application Data

(60) Provisional application No. 62/807,732, filed on Feb. 19, 2019.

(51) Int. Cl.
    *F16B 1/00* (2006.01)
    *F16B 11/00* (2006.01)
    *A47K 1/14* (2006.01)

(52) U.S. Cl.
    CPC ............ *F16B 1/00* (2013.01); *A47K 1/14* (2013.01); *F16B 11/006* (2013.01); *F16B 2001/0035* (2013.01)

(58) Field of Classification Search
    CPC ........................................... F16B 1/00
    USPC .............. 4/295, 286–287, 668, 671; 215/355
    See application file for complete search history.

(56) References Cited

U.S. PATENT DOCUMENTS

| | | | | |
|---|---|---|---|---|
| 5,800,279 | A * | 9/1998 | Densberger | A63B 69/3685 473/250 |
| 7,059,570 | B2 * | 6/2006 | Strong | B64D 17/343 244/147 |
| 2005/0230555 | A1* | 10/2005 | Strong | B64D 1/08 244/152 |
| 2006/0044134 | A1* | 3/2006 | Elliott | G08B 13/2434 340/687 |
| 2017/0328677 | A1* | 11/2017 | Gull | F41G 1/32 |
| 2018/0292184 | A1* | 10/2018 | Down | F42B 12/36 |
| 2019/0282106 | A1* | 9/2019 | Shay | A61B 5/02125 |
| 2020/0094031 | A1* | 3/2020 | Jones | A61K 9/00 |

* cited by examiner

*Primary Examiner* — Lori L Baker
(74) *Attorney, Agent, or Firm* — Chamberlain, Hrdlicka, White, Williams & Aughtry

(57) ABSTRACT

An attachment system may be used for attaching an assembly to a target. The attachment system includes an attachment element adapted to attach to the target. The attachment system also includes a receiver adapted to attach the assembly to the attachment system. A portion of the attachment system is reversibly detachable from the target. The portion of the attachment system is reversibly detachable from the target when the attachment system is attached to the target.

18 Claims, 11 Drawing Sheets

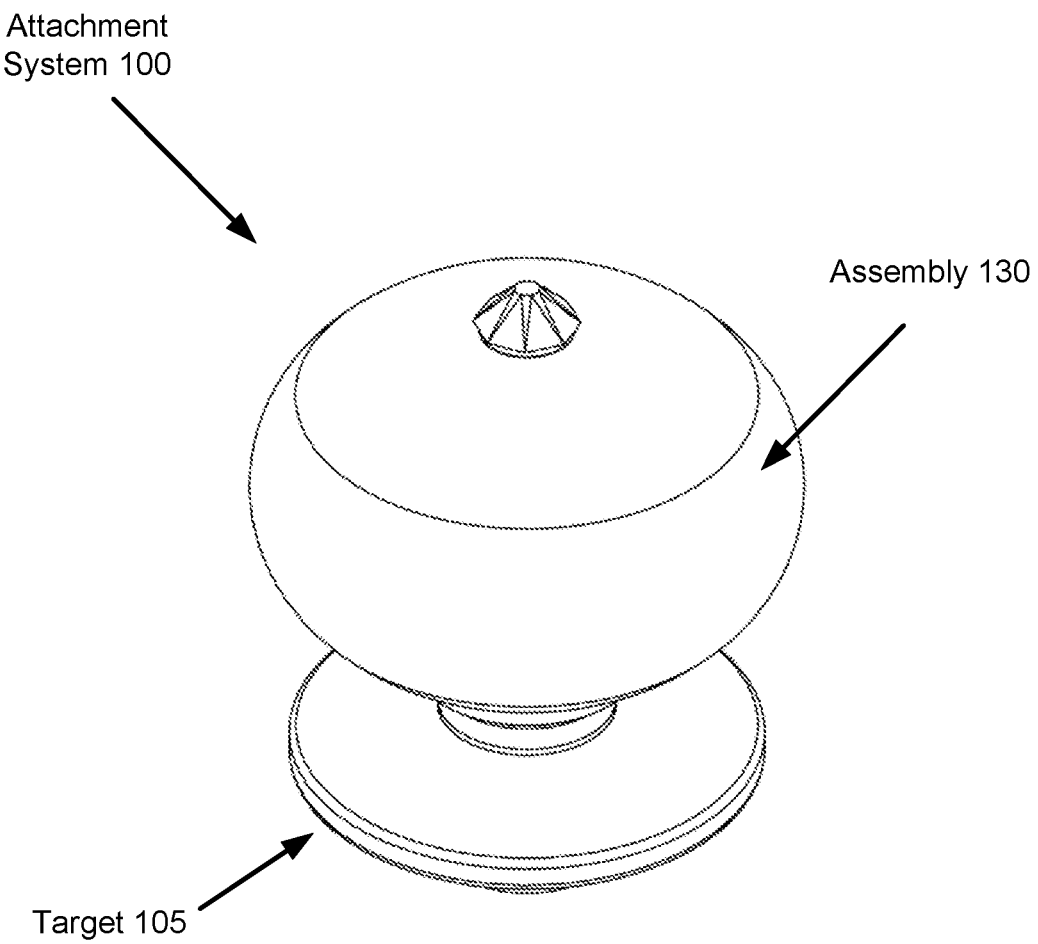
FIG. 1.1

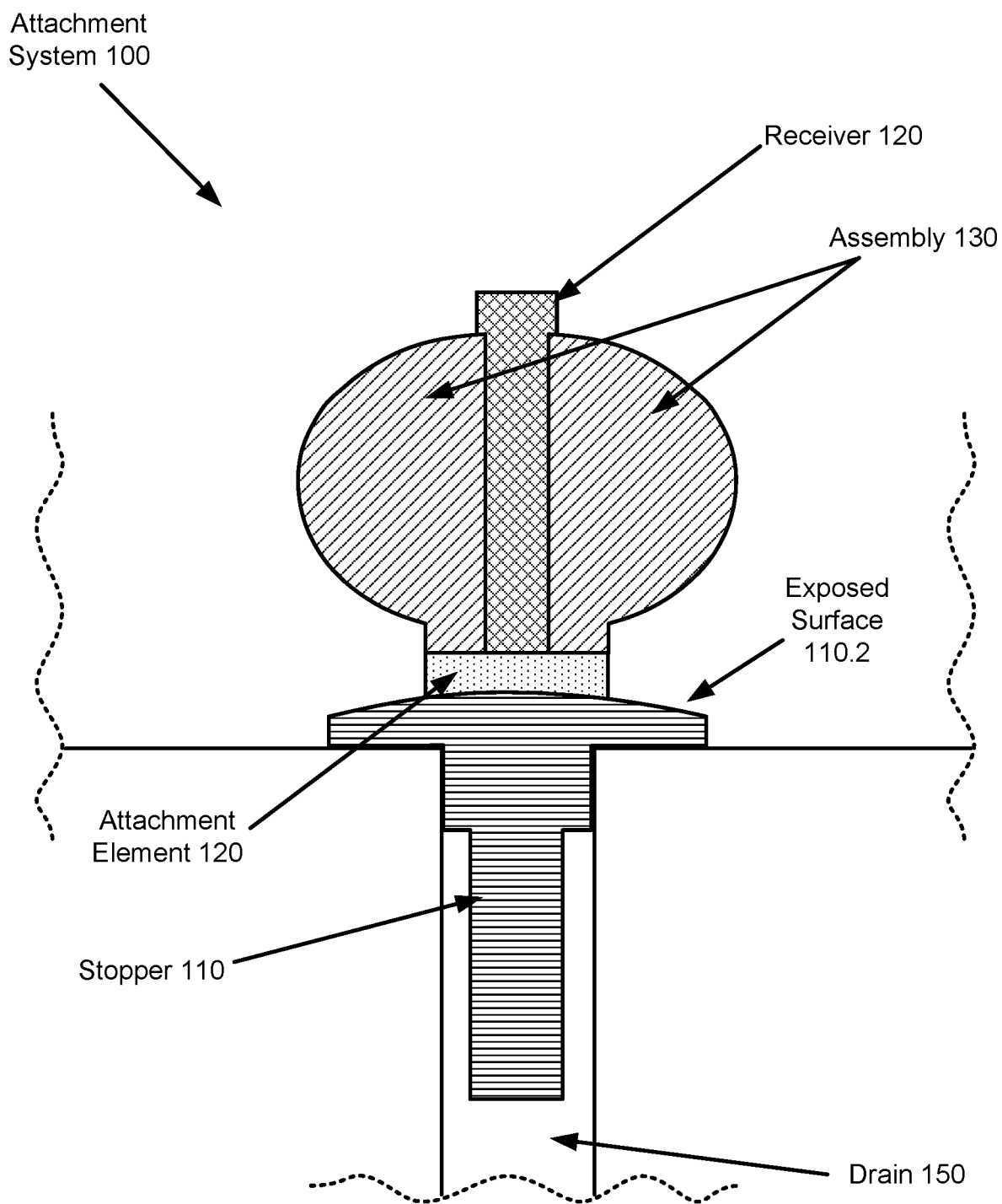
FIG. 1.2

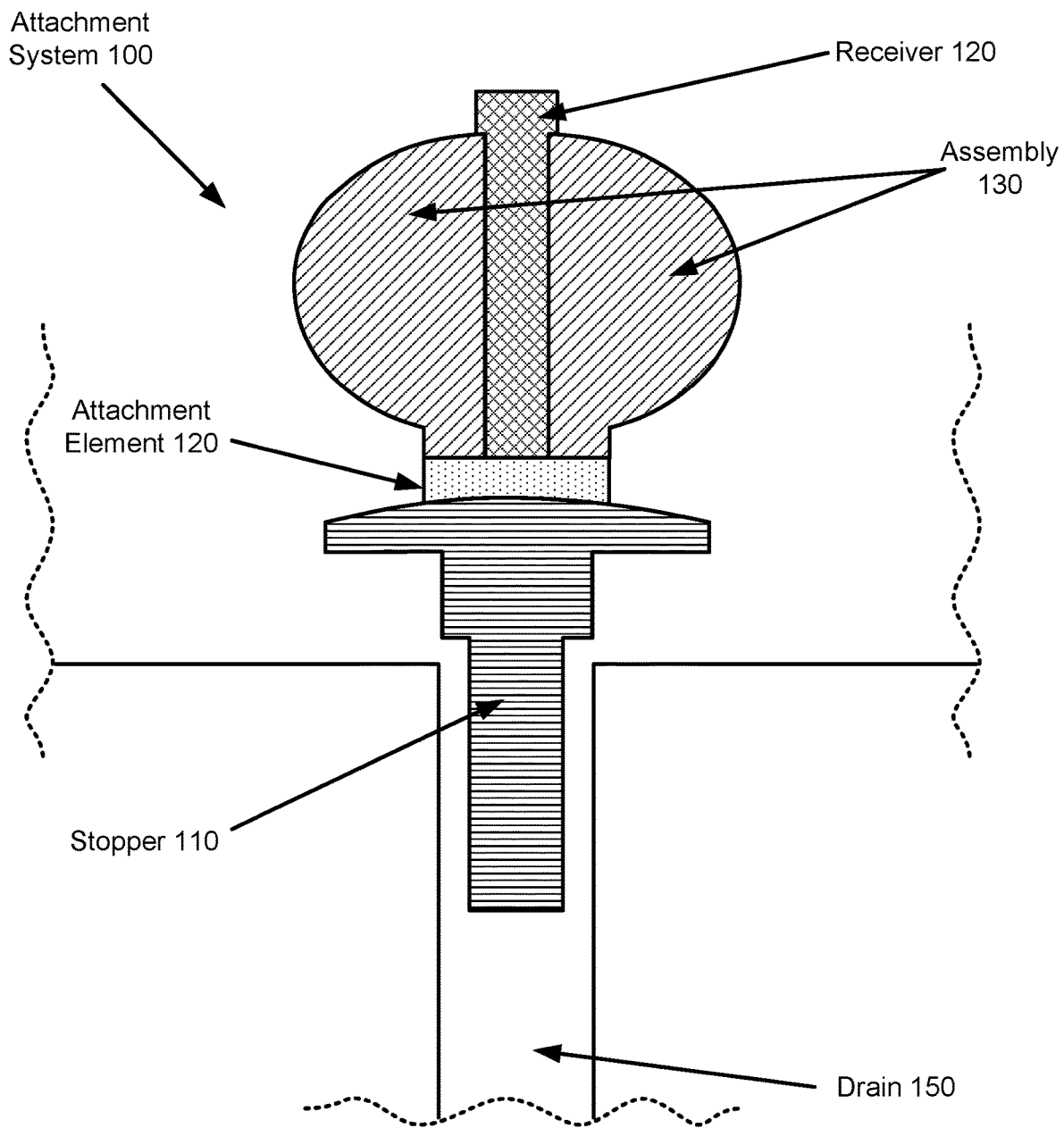
FIG. 1.3

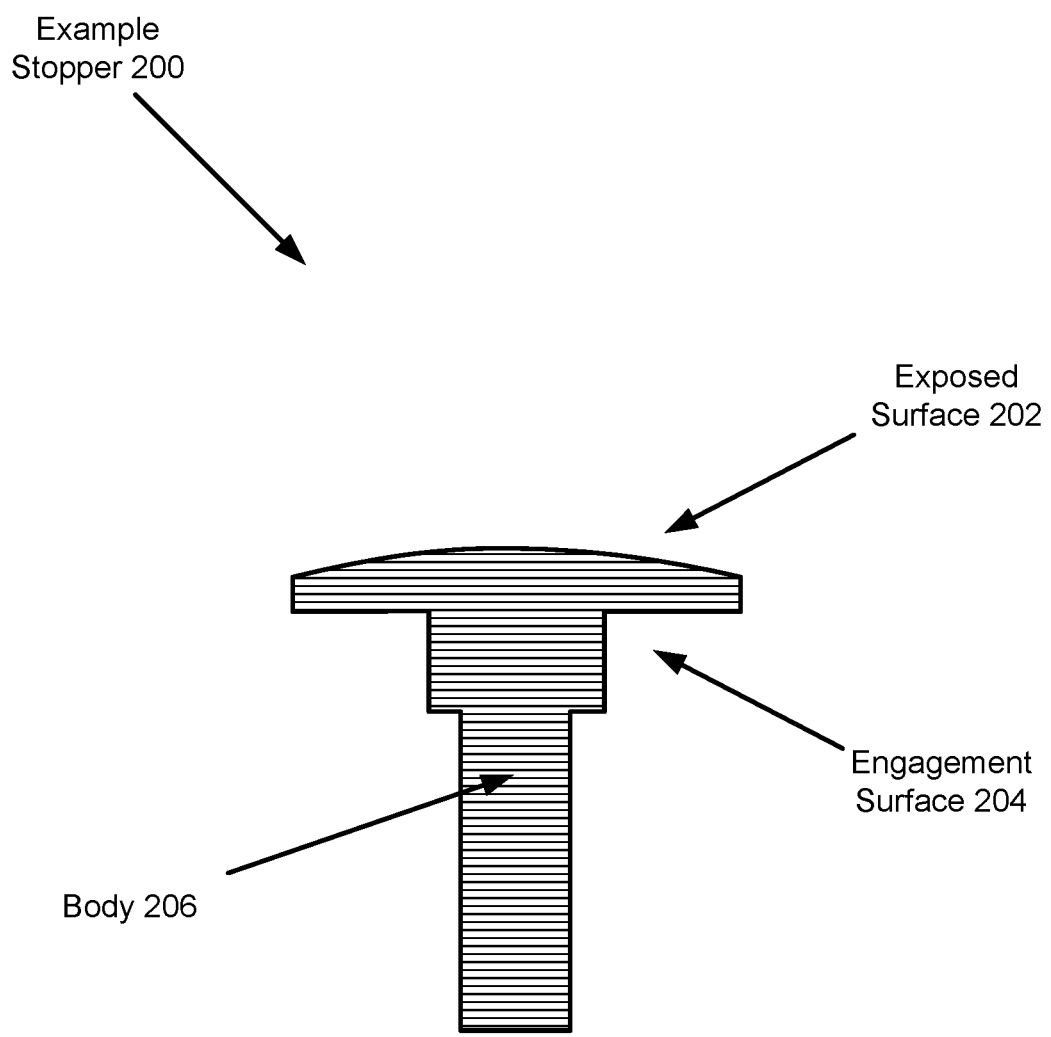
FIG. 2.1

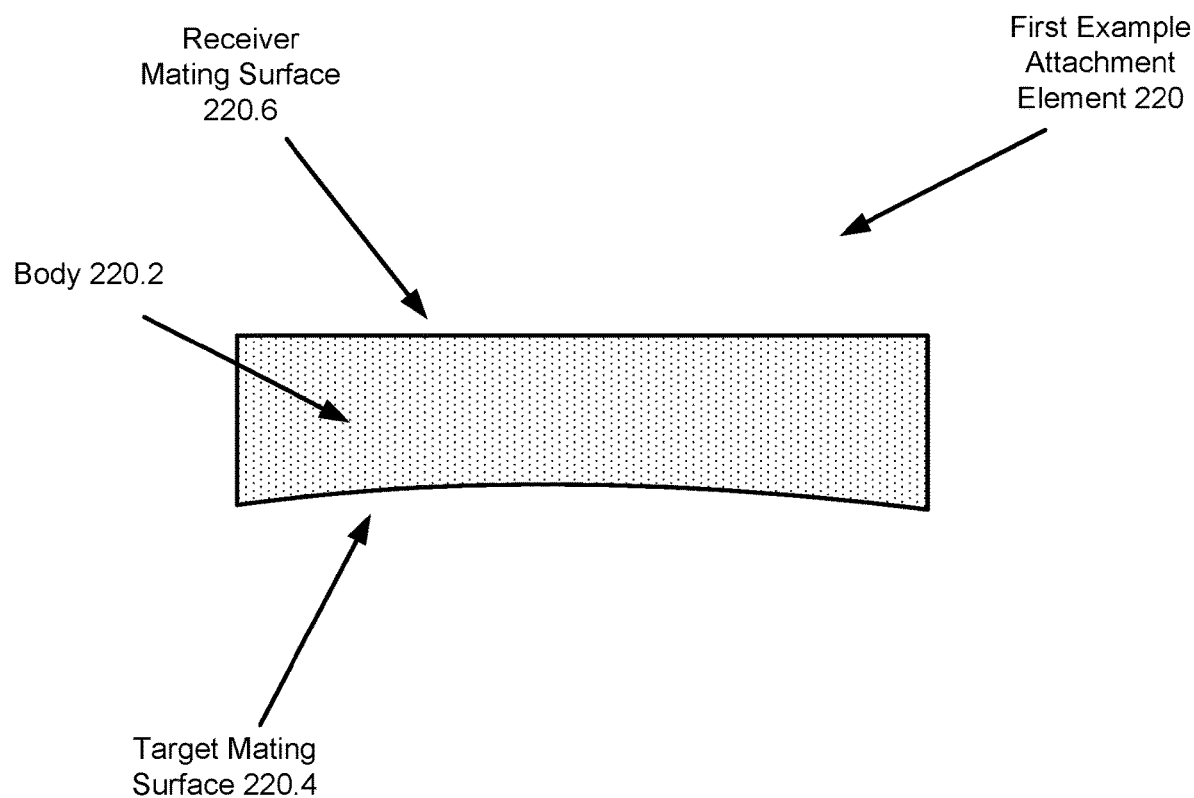
FIG. 2.2

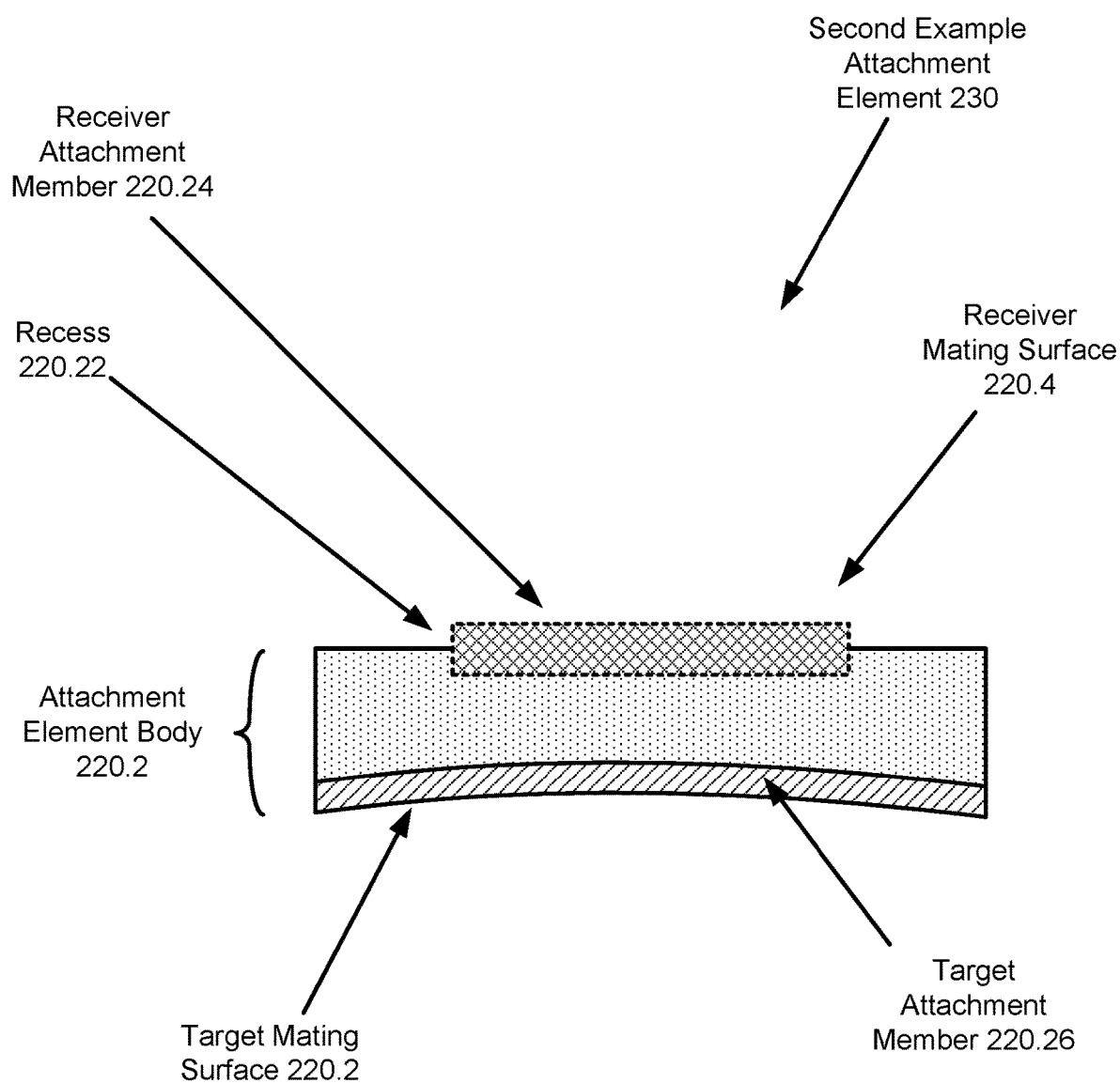
FIG. 2.3

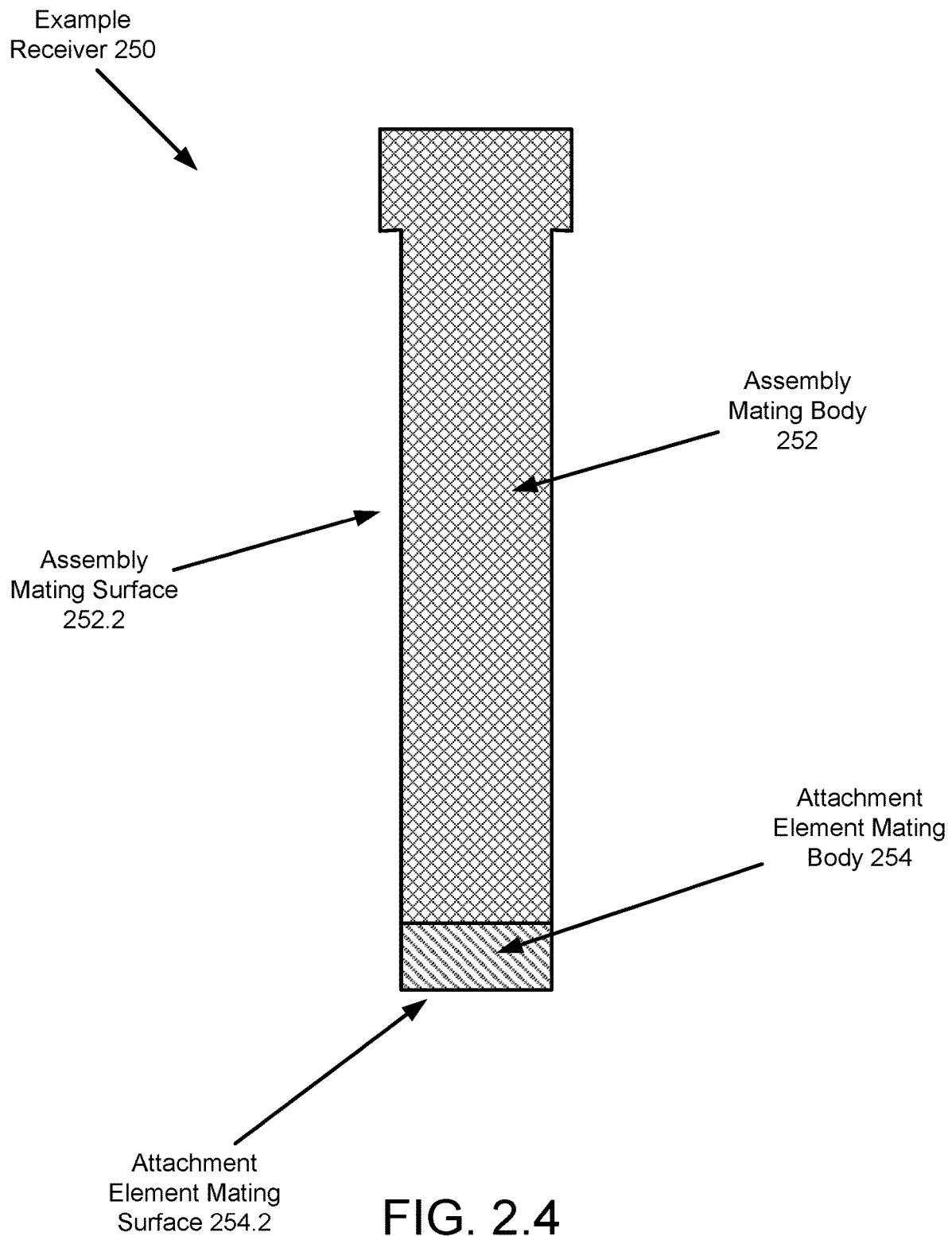
FIG. 2.4

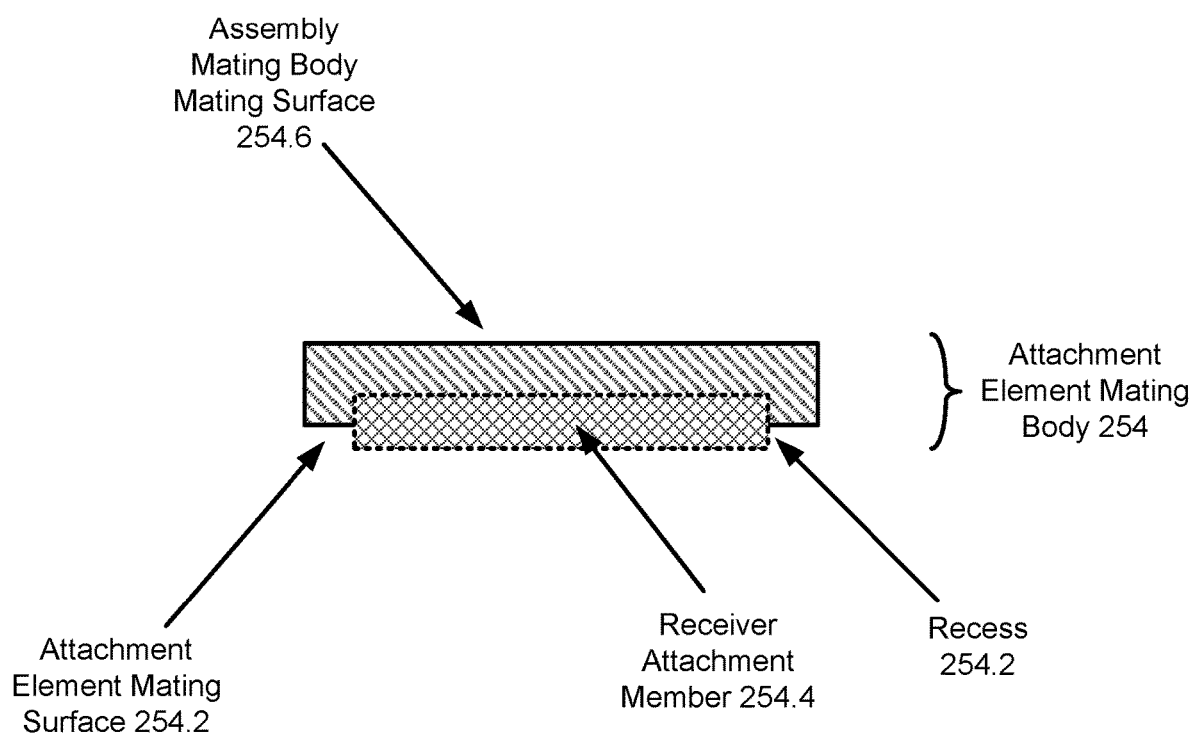
FIG. 2.5

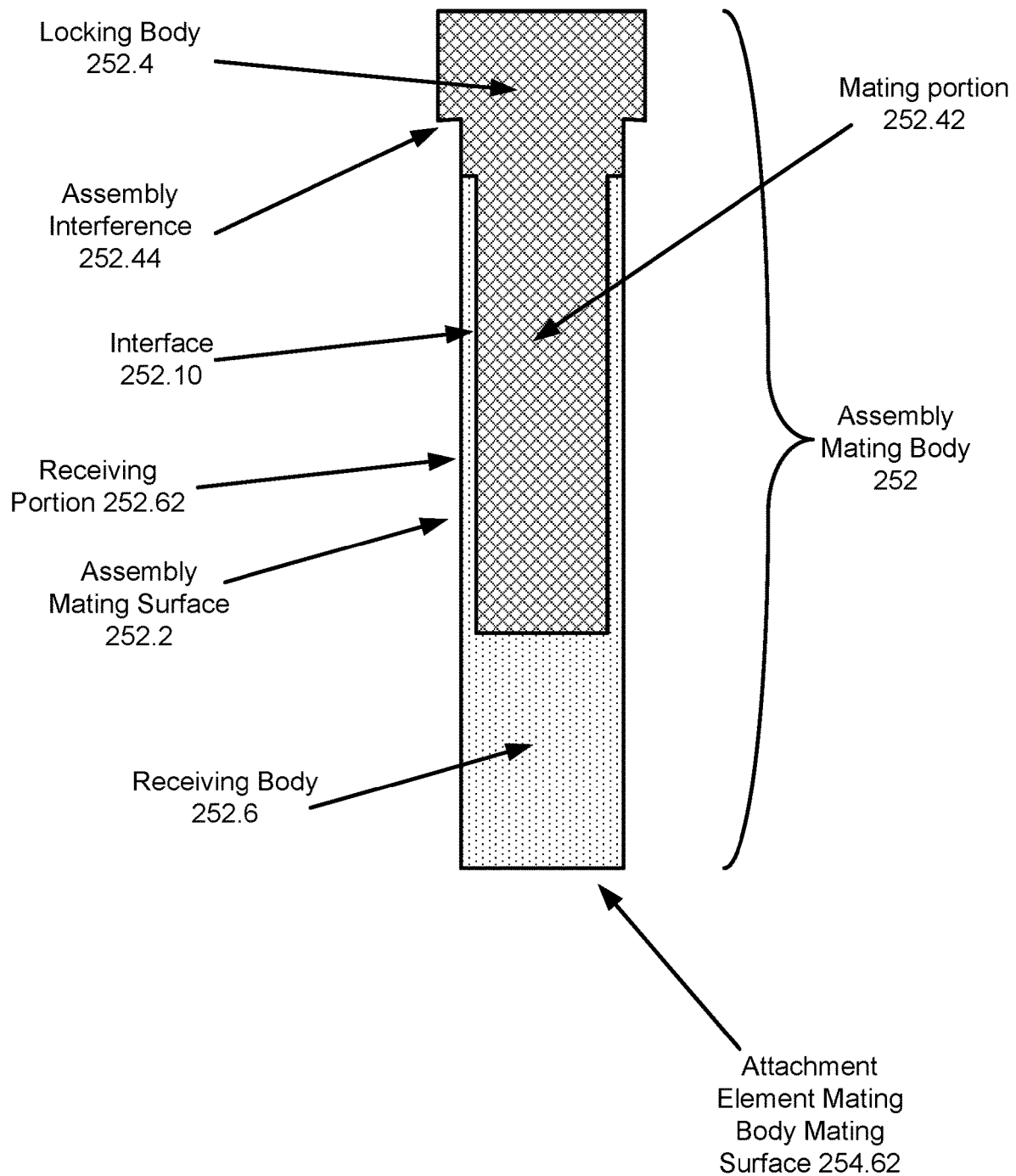
FIG. 2.6

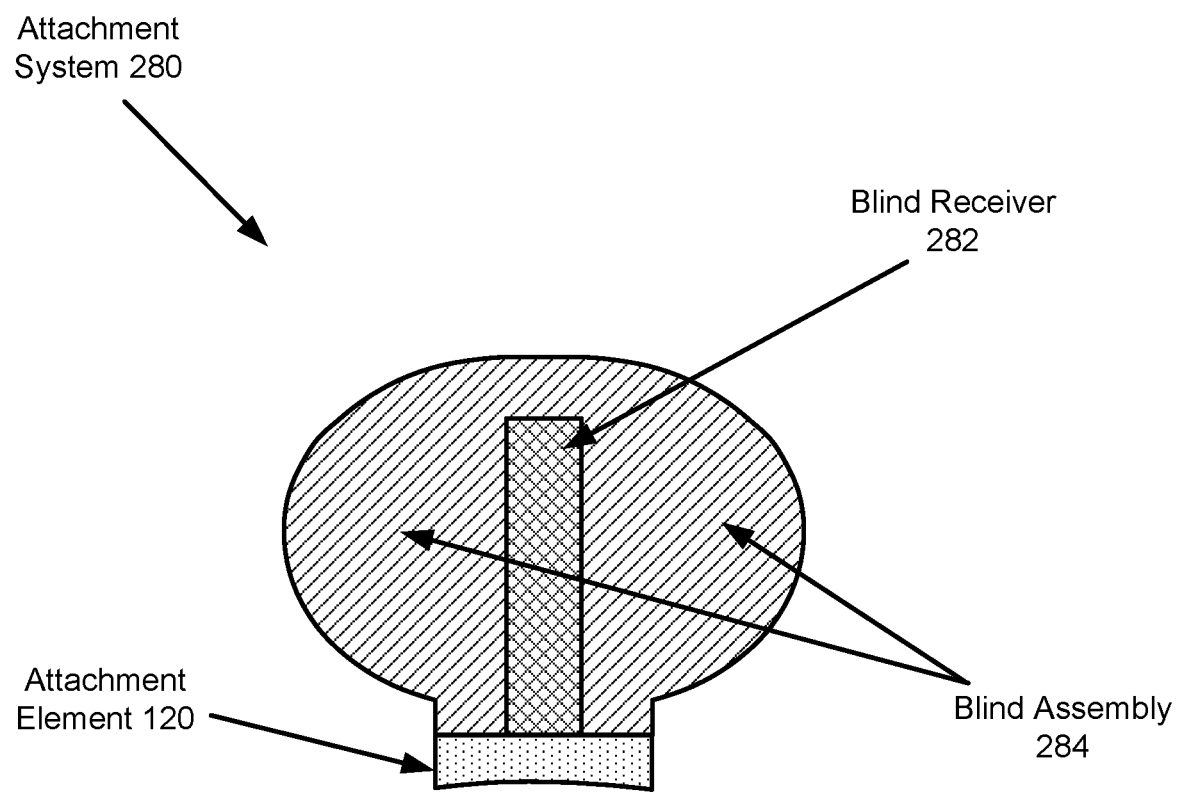
FIG. 2.7

SYSTEM AND METHOD FOR ASSEMBLY ATTACHMENT

BACKGROUND

To assemble multiple components into a structure, the components may need to be attached to one another. The presence of substance in the environment in which the multiple components are to be assembled may reduce the reliability of connections between components. For a structure that includes components that are to be reversibly assembled, the method of attachment between the components impacts the reliability of the assembled structure.

SUMMARY

In one aspect, an attachment system for attaching an assembly to a target in accordance with one or more embodiments of the invention includes an attachment element adapted to attach to the target; and a receiver adapted to attach the assembly to the attachment system. At least a portion of the attachment system is reversibly detachable from the target when the attachment system is attached to the target.

In one aspect, a drain assembly in accordance with one or more embodiments of the invention includes a stopper adapted to reversibly stop a flow of fluid down a drain; an attachment system adapted to reversibly attach an assembly to the stopper; and an assembly.

In one aspect, a method for attaching an assembly to a target in accordance with one or more embodiments of the invention includes permanently attaching an attachment element to a target; reversibly attaching a receiver to the attachment element; attaching the assembly to the receiver; and detaching a portion of the attachment system from the target. The assembly is reversibly attached to the portion of the attachment system.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 1.1 shows a diagram of an attachment system in accordance with one or more embodiments of the invention.

FIG. 1.2 shows a first cross-section diagram of an attachment system in accordance with one or more embodiments of the invention.

FIG. 1.3 shows a second cross-section diagram of an attachment system in accordance with one or more embodiments of the invention.

FIG. 2.1 shows a cross-section diagram of an example stopper in accordance with one or more embodiments of the invention.

FIG. 2.2 shows a cross-section diagram of a first example attachment element in accordance with one or more embodiments of the invention.

FIG. 2.3 shows a cross-section diagram of a second example attachment element in accordance with one or more embodiments of the invention.

FIG. 2.4 shows a cross-section diagram of an example receiver in accordance with one or more embodiments of the invention.

FIG. 2.5 shows a cross-section diagram of an attachment element mating body in accordance with one or more embodiments of the invention.

FIG. 2.6 shows a cross-section diagram of an assembly mating body in accordance with one or more embodiments of the invention.

FIG. 2.7 shows a cross-section diagram of an attachment system including a blind receiver in accordance with one or more embodiments of the invention.

DETAILED DESCRIPTION

Figure 3:
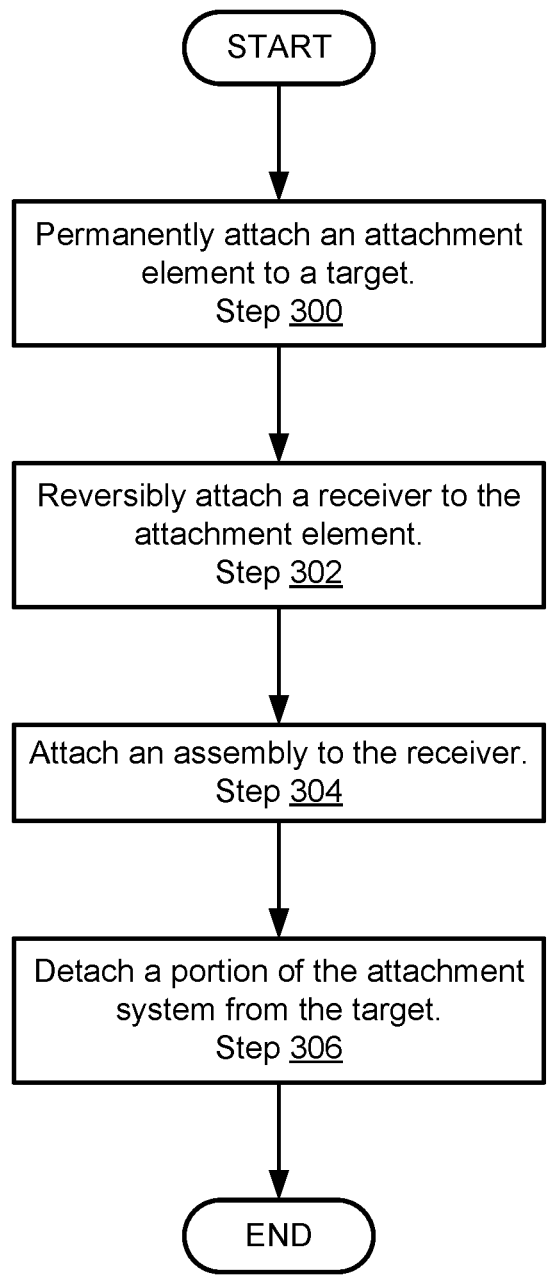
FIG. 3 shows a diagram of a flowchart of attaching an assembly to a target in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for reversibly attaching assemblies to targets. The target may be a surface of a structure. In one or more embodiments of the invention, the target is disposed in an environment that makes attachment to the target challenging. For example, surfaces of the target may be continuously contaminated due to the environment. The contaminants may be, for example, fluids.

In one or more embodiments of the invention, an attachment system facilitates the reversible attachment of an assembly to target. Due to the environment in which the target resides, the assembly may need to be periodically removed from the target. Accordingly, permanent attachment of the assembly to the target may not be desirable.

In one or more embodiments of the invention, the attachment system facilitates the reversible attachment of the assembly to the target by permanently attaching a portion of the attachment system to the target. By doing so, the reliability of attachment of the assembly to the target may be improved.

FIG. 1.1 shows a diagram of an attachment system (100) in accordance with one or more embodiments of the invention. The attachment system (100) may be a physical device for attaching an assembly (130) to a target (105). When the assembly (130) is attached to the target (105) by the attachment system (100), the attachment may be reversible. In other words, the assembly (130) may be detachable from the target (105).

In one or more embodiments of the invention, the assembly (130) is detachable from the target (105) using physical force when the assembly (130) is attached to the target (105) by the attachment system (100). The magnitude of the physical force required to detach the assembly (130) from the target (105) may be large enough so that in ordinary use the assembly (130) does not detach from the target (105).

In one or more embodiments of the invention, the physical force is a translation of the assembly (130) away from the target (105). For example, a person may grasp the assembly (130), pull the assembly (130) away from the target (105), and detach the assembly (130) from the target via the physical force.

In one or more embodiments of the invention, the physical force is a rotation of the assembly (130) with respect to the target (105). For example, a person may grasp the assembly (130), rotate the assembly (130) with respect to the target (105), and detach the assembly (130) from the target via the physical force.

In one or more embodiments of the invention, the physical force is a tilt of the assembly (130) with respect to the target (105). For example, a person may grasp the assembly (130), tilt the assembly (130) with respect to the target (105) to generate space between the assembly and the target (which may reduce the force required to remove the assembly from the target), and detach the assembly (130) from the target via the physical force after tilting the assembly.

The assembly (130) may be physical device. For example, the assembly (130) may be a knob or other structure for use with respect to grasping. The assembly (130) may be other types of physical devices without departing from the invention.

In one or more embodiments of the invention, the assembly (130) includes features that enable the assembly to attach to the attachment system. For example, the features may be a through hole that enables a portion of the attachment system to attach the assembly (130) a portion of the attachment system (100). For additional details with respect to attachment of the assembly (130) to the attachment system (100), refer to FIGS. 2.4-2.6.

The assembly (130) may include any number of components formed from any number of materials. For example, the assembly (130) may be a single component composed of a single material or the assembly (130) may include a multitude of components each of which being formed from the same and/or different materials.

In one or more embodiments of the invention, the assembly (130) is a knob. The knob may include a through-hole for attachment to the attachment system (100). The knob (130) may be formed from, for example, ceramic, metal, or glass. The knob (130) may be formed in other materials without departing from the invention.

While the assembly (130) is illustrated in FIG. 1.1 as a prolate spheroid, the assembly (130) may have other shapes without departing from the invention. For example, the assembly (130) may be rectangular, hexagonal, pentagonal, or another shape. Further, the assembly (130) may include any number of components and any number of different shapes. For example, the assembly (130) may include a first component having a spherical shape and a second component having rectangular shape.

In one or more embodiments of the invention, the target (105) is a surface. The surface may be a portion of a stopper of the drain assembly. For example, the target (105) may be an exposed surface of the stopper of the drain assembly. For additional details regarding the target (105), refer to FIGS. 1.2-1.3.

While the target (105) has been described as being a surface of the stopper, the target (105) may be other types of physical structures without departing from the invention. For example, the target (105) may be a surface of a wall of a basin, a portion of a faucet, a flow control mechanism of a bathtub, a surface of an appliance (e.g., washer, dryer, refrigerator, stove, etc.), a surface of an automobile (e.g., shifting lever, steering wheel, dashboard, etc.), or any other location.

In one or more embodiments of the invention, the target (105) is disposed in an environment that exposes the target (105) to fluids. The fluids may be, for example, water, oils, cleaning fluids, soaps, and/or food residue. The fluids may be other types of liquids without departing from the invention. The fluids may be of a substantially different temperature than the environment. The temperature of the fluids may change over time (e.g., when the environment is a sink where the target (105) is periodically exposed to hot and cold water).

To further clarify embodiments of the invention, cross-sectional diagrams of an attachment system (100) attaching an assembly (130) to a stopper (110) of a drain assembly in accordance with one or more embodiments of the invention are shown in FIGS. 1.2-1.3. In FIG. 1.2, the diagram illustrates a scenario in which the drainage assembly is preventing fluid from flowing into a drain while in FIG. 1.3 the drainage assembly is not preventing fluid from flowing into the drain.

Turning to FIG. 1.2, the attachment system (100) may include an attachment element (120) that attaches the attachment system (100) to the stopper (110). In FIG. 1.2, the attachment element (120) may attach to an exposed surface (110.2) of the stopper (110). The attachment may provide a reversible attachment of the attachment system (100) to the stopper (110), i.e., detachable via the application of force. When attached to the stopper (110), the attachment system (100) may be restricted and/or preventing from translating and/or rotating with respect to the stopper (110). For additional details regarding the attachment element, refer to FIGS. 2.2-2.3.

The attachment system (100) may include a receiver (120). The receiver (120) may reversibly lock the assembly (130) to the attachment system (100). When locked to the attachment system (100), the assembly may be restricted and/or preventing from translating and/or rotating with respect to the attachment system (100).

In one or more embodiments of the invention, the receiver (120) is permanently attached to the attachment element (120). For example, portions of the receiver (120) and portions of the attachment element (120) may be a unitary structure or structures that are permanently (e.g., glued, braised, etc.) adhered to each other. For additional details regarding the receiver (120), refer to FIGS. 2.4-2.6.

As noted above, attachment system (100) is attached to an exposed surface (110.2) of the stopper (110) in FIG. 1.2. The stopper (110) may reversibly close drain (150). In this environment, it may be difficult to form an attachment between the attachment element (120) and the exposed surface (110.2). The presence of fluids may make reattachment of the attachment element (120) to the exposed surface (110.2) challenging. One or more embodiments of the invention may address the challenging nature of such environments by providing a high reliability method of reversibly attaching portions of the attachment system (100) to the stopper (110). For additional details regarding challenging environment such as stoppers of drainage assemblies, refer to FIG. 2.1.

For example, in some embodiments of the invention, a portion of the attachment element (120) may stay permanently attached to the exposed surface (110.2) when the attachment system (100) is detached from the stopper (110). By doing so, the reliability of reattachment of the attachment system (100) may be improved when compared to scenarios in which the entire attachment system (100) detaches from the stopper (110) or other targets.

As noted above, embodiments of the invention may provide systems, devices, and/or methods for reversibly attaching assemblies to targets. FIG. 2.1 shows an example stopper (200) in accordance with one or more embodiments of the invention. The stopper (200) may be a portion of the drainage assembly that restricts the flow of fluids such as, for example, water and/or oils.

The stopper (200) may include a body (206) that physically restricts fluid flow. The stopper (200) may be moved to enable fluid flow to occur and/or be prevented with respect to a drain.

The body (206) may include an exposed surface (202) that is exposed to fluids when fluid flow is both enabled and prevented. For example, the exposed surface (202) may be a top surface of the example stopper (200) that forms a portion of a wall of a basin.

In one or more embodiments of the invention, the exposed surface (202) has a shape of a spherical cap. In other words, the exposed surface (202) may not be flat and may include some curvature that makes attachment of structures to the exposed surface (202) challenging. In one or more embodiments of the invention, the exposed surface (202) is convex in at least one dimension. In one or more embodiments of the invention, the exposed surface (202) is convex in two dimensions.

The body (206) also include engagement surface (204) that is adapted to engage other structures when preventing fluid in a drain. For example, the engagement surface (204) may be a bottom surface of the example stopper (200) that touches walls of a basin when the example stopper (200) is moved to a position to stop fluid flow down a drain of the basin.

As noted above, embodiments of the invention may provide high reliability mechanisms for attaching and detaching attachment assemblies from targets. FIGS. 2.2-2.3 show diagrams of attachment elements in accordance with embodiments of the invention.

FIG. 2.2 shows a diagram of a first example attachment element (220) in accordance with one or more embodiments of the invention. The first example attachment element (220) may include a body (220.2), a target mating surface (220.4), and receiver mating surface (220.6). Each component of the first example attachment element (220) is discussed below.

The body (220.2) may be a physical structure. The body (220.2) may be formed from one or more materials such as, for example, metal and plastic.

In one or more embodiments of the invention, the body (220.2) is formed from magnetic material. The magnetic material may cause the body (220.2) to reversibly attach to a target placed in proximity to the target.

For example, if the target is the stopper of drainage assembly that includes material with sufficient magnetic susceptibility, the body (220.2) may reversibly attach to the stopper via magnetic force.

In one or more embodiments of the invention, the magnetic material is a magnetic grade of stainless steel or galvanized steel. The magnetic grade of stainless steel may be ferritic grade, martensitic, or duplex grades of stainless steel. The magnetic grade of stainless steel may not be an austenitic grade.

In one or more embodiments of the invention, the body (220.2) is formed from a plastic material. The plastic material may be, for example, thermosetting plastics, thermoplastics, polyethylene terephthalate, polystyrene, polyvinyl chloride, polytetrafluoroethylene, polyvinylidine chloride, polyethylene, or polypropylene. The plastic material may reversibly conform to the target when pressed against the target. By doing so, the suction force between the body (220.2) and the target may be generated. The suction force may reversibly attach the body (220.2) to the target.

The body (220.2) may be formed from other materials that cause the body (220.2) to reversibly attach to the target without departing from the invention. For example, the body (220.2) may be formed from elastomers (e.g., polydimethylsiloxane), rubbers, or other deformable materials. Additionally, the body (220.2) may be inhomogeneous. In other words, different portions of the body (220.2) may be formed from different materials.

For example, a portion of the body (220.2) proximate to the target mating surface (220.4) may be formed from a first material while a second portion of the body (220.2) proximate to the receiver mating surface (220.6) may be formed for a second material. The first material may facilitate reversible attachment while the second material may facilitate permanent attachment.

The target mating surface (220.4) may be a surface of the body (220.2) adapted to reversibly attach to the target. The target mating surface (220.4) may have a shape that is complementary to a surface of the target.

In one or more embodiments of the invention, the target mating surface (220.4) has a shape of a spherical.

In one or more embodiments of the invention, the target mating surface (220.4) is concave in at least one dimension. In one or more embodiments of the invention, the target mating surface (220.4) is concave in two dimensions.

The receiver mating surface (220.6) may be a surface of the body (220.2) adapted to attach to a receiver of an attachment system. In one or more embodiments of the invention, the receiver mating surface (220.6) is a logical surface and does not represent a physical distinction between a receiver and an attachment element. For example, portions of the receiver and the attachment element may be a unitary structure.

FIG. 2.3 shows a diagram of a second example attachment element (230) in accordance with one or more embodiments of the invention. The second example attachment element (230) may include multiple components to facilitate attachment of the attachment system to a target. The second example attachment element (230) may include a body (220.2), a target mating surface (220.4), and receiver mating surface (220.6) similar to those discussed with respect to FIG. 2.3. The second example attachment element (230) may also include a recess (220.22), a target attachment member (220.26), and a receiver attachment member (220.24). Each additional component of the second example attachment element (230) is discussed below.

The recess (220.22) may be a void in the attachment element body (220.2). The void may have a shape complimentary to a shape of the receiver attachment member (220.24). By doing so, a portion of the receiver attachment member (220.24) may be received by the recess (220.22). As will be discussed with respect to FIG. 2.5, a portion of a receiver may have another recess such that the receiver attachment member (220.24) may be entirely surrounded by the attachment element and the receiver when the two components are attached to each other via the receiver attachment member (220.24). The recess (220.22) may be disposed on the receiver attachment member (220.24).

In one or more embodiments of the invention, the receiver attachment member (220.24) reversibly attaches the receiver from the attachment element body (220.4). The receiver attachment member (220.24) may be a physical device. Receiver attachment member (220.24) may form the reversible attachment using any mechanism.

In one or more embodiments of the invention, the receiver attachment member (220.24) is a magnet. Receiver attachment member (220.24) may be physically attached to either the attachment element or the receiver. In this manner, when the attachment element in the receiver are placed in proximity to one another they may be reversibly attach to each other via magnetic force exerted by receiver attachment number (220.24).

In one or more embodiments of the invention, the receiver attachment member (220.24) is a post that interferes with recesses (e.g., 220.22) disposed on the attachment element and receiver. By interfering, the receiver attachment member (220.24) may reversibly attach the attachment element and receiver when the receiver attachment member (220.24) is disposed in the corresponding recesses.

In one or more embodiments of the invention, the receiver attachment member (220.24) is a screw that is adapted to engage with threads disposed in the recesses of the attachment element and/or the receiver. By engaging the threads, the receiver attachment member (220.24) may reversibly attach the attachment element and the receiver when receiver attachment member (220.24) engages the threads. The receiver attachment member (220.24) may be permanently attached to either the attachment element or the receiver without departing from the invention.

While the receiver attachment member (220.24) has been described as being a limited number of physical devices, the receiver attachment member (220.24) may be other types of physical devices for reversibly attaching the attachment element in the receiver without departing from the invention.

In one or more embodiments of the invention, the target attachment member (220.26) is a physical device adapted to facilitate attachment of the target mating surface (220.2) to a target. The target attachment member (220.26) may be, for example, a layer of adhesive material. The adhesive material may be a waterproof adhesive. In one or more embodiments of the invention, the adhesive material is a waterproof material and is not a water resistant material. The adhesive material may be, for example, a two-part epoxy, a cyanoacrylate based adhesive (e.g., methyl 2-cyanoacrylate (MCA), ethyl 2-cyanoacrylate, n-butyl cyanoacrylate, octyl cyanoacrylate, 2-octyl cyanoacrylate), or an adhesive pad (that may be a solid form of a cyanoacrylate based adhesive or epoxy). The two-part epoxy may include a first part that is an activator (e.g., Homopolymerisation based activator, Anhydrides, Phenols, Thiols) and a second part that is an epoxy resin composition (e.g., Bisphenol A epoxy resin, Bisphenol F epoxy resin, epoxidised novolacs based epoxy resin, Cycloaliphatic epoxy resin, Epoxy resin diluents, Glycidylamine epoxy resin).

In one or more embodiments of the invention, the target attachment member (220.26) includes a deformable layer of material. The deformable layer of material may be adapted to perform into a shape that is complementary to a shape of a target. By doing so, the adhesion between the attachment element and the target may be improved. For example, the target attachment member (220.26) may be a layer of Polydimethylsiloxane. An adhesive may be disposed on the deformable layer of material and/or the deformable layer of material may itself be the adhesive.

In one or more embodiments of the invention, the target attachment member (220.26) is a layer of epoxy. The thickness of the layer may be such that it is able to fill in any gaps between the attachment element body (220.2) and the target when the attachment element body (220.2) is disposed on the target.

As noted above, a receiver of an attachment system may enable an assembly to be attached to the attachment system. FIGS. 2.4-2.6 show diagrams of portions of a receiver in accordance with embodiments of the invention.

FIG. 2.4 shows a diagram of an example receiver (250) in accordance with one or more embodiments of the invention. As noted above, the example receiver (250) may provide for the reversible attachment of an assembly to the attachment system.

The example receiver (250) may include an assembly mating body (252) and an attachment element mating body (254). Each component of the example receiver (250) is discussed below.

In one or more embodiments of the invention, the assembly mating body (252) is a physical structure for attaching an assembly to the attachment body. The assembly mating body (252) may be a cylindrical structure such as, for example, a tube or rod. The assembly mating body (252) may be adapted to traverse through the hole in an assembly and lock the assembly to the assembly mating body (252). An assembly mating surface (252.2) of the assembly mating body (252) may interface with the assembly when the assembly is locked to the assembly mating body (252). For additional details regarding locking an assembly to the assembly mating body (252), refer to FIG. 2.6.

The assembly mating body (252) may be attached to the attachment element mating body (254). In one or more embodiments of the invention, the attachment element mating body (254) is a physical structure for attaching the example receiver (250) to an attachment element. In one or more embodiments of the invention, the attachment element mating body (254) reversibly attaches the receiver to the attachment element. The attachment element mating body (254) may include an attachment element mating surface (254.2) that reversibly attaches to the attachment element. For additional details regarding reversibly attaching the example receiver (250) to the attachment element, refer to FIG. 2.5.

In one or more embodiments of the invention, the attachment element mating body (254) permanently attaches the example receiver (250) to the attachment element. The attachment may be made, for example, using adhesive, braising, or other methods of permanently attaching these components. In one or more embodiments of the invention, the attachment element mating body (254) and the attachment element, or portions thereof, are a unity structure. In such a scenario, the attachment element mating surface (254.2) is a logical surface a does not represent a physical distinction between these components.

To further clarify embodiments of the attachment element mating body (254), a diagram of the attachment element mating body (254) in accordance with embodiments of the invention is shown in FIG. 2.5. In FIG. 2.5, the attachment element mating body (254) is shown in a configuration that facilitates reversible attachment of the attachment element mating body (254) to the attachment element.

Specifically, the attachment element mating body (254) may include a receiver a recess (254.2) for receiving a receiver attachment member (254.4). As discussed with respect to FIG. 2.2, the receiver attachment member (254.4) may facilitate reversible connection between the receiver and the attachment element. The recess (254.2) may be disposed on an attachment element mating surface (254.2) of the attachment element mating body (254).

The attachment element mating body (254) may include an assembly mating body mating surface (254.6) opposite of the attachment element mating surface (254.2). The assembly mating body mating surface (254.6) may be a physical or logical surface that interfaces with an assembly mating body of a receiver. The assembly mating body mating surface (254.6) may be a logical surface when the attachment element mating body (254) and the assembly mating body are a unitary structure. In a case where the attachment element mating body (254) is separate from the assembly mating body, the assembly mating body mating surface (254.6) may be attached to the assembly mating body via any method (e.g., adhesive, braising, mechanical attachment, etc.) without departing from the invention.

To further clarify embodiments of the assembly mating body (252), a diagram of the assembly mating body (252) in accordance with embodiments of the invention is shown in FIG. 2.6. As noted above, the assembly mating body (252) may facilitate reversible attachment of an assembly to the attachment system.

The assembly mating body (252) may include receiving body (252.6) and a locking body (252.4). Each of these components may be reversibly attachable to each other. When in an unattached state, an assembly may be disposed on one of these components. The assembly mating body (252) and receiving body (252.6) may then be reattached thereby locking the assembly to the attachment system.

In one or more embodiments of the invention, the receiving body (252.6) is a post having a receiving portion (252.62) for reversibly attaching the locking body (252.4). The post may be cylindrical in shape and formed from any type of material. In some embodiments of the invention, the receiving body (252.6) is a unitary structure with all or a portion of the attachment element (e.g., 254, FIG. 2.5). In other embodiments of the invention, the receiving body (252.6) is a separate structure that is attached to the attachment element via an attachment element mating body mating surface (254.64).

The receiving portion (252.62) may be a recess disposed on an end of the receiving body (252.6) opposite the attachment element mating body mating surface (254.62). The recess may be cylindrical in shape and include element on the surface of the recess for creating an interface (252.10) with the locking body (252.4). Creating the interface (252.10) may reversibly secure the locking body (252.4) to the receiving body. The element on the surface of the recess may be, for example, threads, pins, grooves, or other types of physical features for generating frictional force between the receiving body (252.6) and the locking body (252.4) when a predetermined portion of the locking body (252.4) is disposed in the receiving portion (252.62).

In one or more embodiments of the invention, the locking body (252.4) is a post having a mating portion (252.42) and an assembly interference (252.44). The mating portion (252.42) may be a physical structure for reversibly securing the locking body (252.4) to the receiving body (252.6). The mating portion (252.42) may have a shape corresponding to a shape of the receiving portion (252.62) and may also include elements on the surface of the mating portion (252.42) for creating the interface (252.10).

In one or more embodiments of the invention, the receiving portion (252.62) is a threaded recess and the mating portion (252.42) is a threaded cylindrical post. The locking body (252.4) may be attached to the receiving body (252.6) by rotating the locking body (252.4) with respect to the receiving body (252.6) to secure the threads of the mating portion (252.42) to the threads of the receiving portion (252.62).

The assembly interference (252.44) may be a physical feature that reduces or eliminates the ability of the assembly disposed on the assembly mating surface (252.2) from translating and/or rotating with respect to the attachment system. For example, the assembly interference (252.44) may be a flange that extends outward from the locking body (252.4). The flange may have a diameter that is larger than the diameter of a hole or other structure through which the assembly mating body (252) is threaded when attaching the assembly. The assembly interference (252.44) may be other types of physical features without departing from the invention. For example, the assembly interference (252.44) may be a pin (not shown) disposed on the assembly mating surface (252.2) and oriented away from the assembly mating surface (252.2). The assembly may include a corresponding recess for receiving the pin. The height of the pin with respect to the assembly mating surface (252.2) may prevent the assembly from rotating and/or translating with respect to the attachment system while the assembly is attached to the attachment system.

The locking body (252.4) and the receiving body (252.6) may be made of any material including, but not limited to, metal and plastic. Different portions of the locking body (252.4) and the receiving body (252.6) may be formed from different materials, i.e., these structures may be heterogeneous.

While the attachment system has been described as including a number of separate components, embodiments of the invention are not limited to scenarios in which the attachment system is made of separate components. Any of the components, or portions thereof, described throughout this application may be combined into any number of unitary structures, broken down into any number of sub-structures, and/or modified to provide the functionality of each of the respective components of the attachment system without departing from the invention. Additionally, any number of components may be formed of any number of sub-components that are combined in a permanent (e.g., permanent adhesives) or semi-permanent manner (interference features).

Further, any of the components described throughout this application may be formed from a suitable material without departing from the invention. For example, in one or more embodiments of the invention the attachment element and/or the receiver are formed, in part, of a water resistant or waterproof material. Such materials include stainless steel (of any composition that is resistant to wear/damage due to the presence of water or other materials in an environment), materials coated in a corrosion resistant layer (e.g., chrome plated steel), and any other type of material capable of subsisting in the environment in which the attachment system may reside. The attachment element and/or the receiver may be stainless steel (all ferritic, martensitic, and duplex grades), aluminum, copper, bronze, brass, or stainless steel. Different portions of the aforementioned components may be made of similar and/or different materials. In one or more embodiments of the invention, all of the components are stainless steel or galvanized steel.

To further clarify aspects of embodiments of the invention, a cross section diagram of an attachment system (280) that includes a blind receiver (282) in accordance with one or more embodiments of the invention is shown in FIG. 2.7. The attachment system of FIG. 2.7 may be similar to that illustrated in FIGS. 1.1-2.6. To facilitate attachment of blind assemblies (e.g., 284) that do not include a through-hole but, instead, include a non-through-hole attachment structure (e.g., a recess, indentation, void, or other structural element that allows for the attachment of the blind assembly), the attachment system (280) may include a blind receiver (282).

The blind receiver (282) may be similar to the receiver discussed with respect to FIGS. 1.1-2.6 but does not have a length sufficient to traverse a length of the blind assembly (284). For example, the blind assembly (284) may be a rod, a threaded rod, a keyed rod, or other mechanical element attached to the attachment element (120) that enables a blind assembly (284) to be attached to the attachment element (120). The blind assembly (284) may reversibly attach via any method without departing from the invention. For example, the blind assembly (284) may include threads corresponding to those disposed on the blind receiver (282). In some embodiments of the invention, an adhesive agent, press fit, or other type of chemical or mechanical attachment between the blind assembly (284) and the blind receiver (282) may be used. By doing so, different types of assemblies with different types of mechanical structures than those illustrated in FIGS. 1.1-2.6 may be reversibly attached to targets.

While the mechanical structures of FIGS. 1.1-2.7 have been illustrated as included a limited number of components, an attachment system in accordance with embodiments of the invention may include additional, different, and/or fewer components without departing from the invention. For example, an attachment system in accordance with embodiments of the invention may include any number of seals (e.g., O-rings, deformable pads, etc.) for isolating the environment from the attachment system, an assembly, and/or a target. For clarity, with respect to FIG. 1.2, seals may be disposed along the length of the receiver and/or between the receiver and the assembly to reduce the likelihood of water infiltrating between the assembly and the receiver. In such a scenario, the seals may be O-rings. Other types of seals may be utilized at other locations to reduce the likelihood of water infiltration and/or provide mechanical buffers between different components (e.g., mechanical buffering between the attachment element and the assembly) of an attachment system.

As discussed above, an attachment system may be used in accordance with embodiments of the invention to reversibly attach an assembly to a target. FIG. 3 shows a method in accordance with one or more embodiments of the invention that may be performed by components of the system of FIG. 1.1. While illustrated as a series of steps in FIG. 3, any of the steps may be omitted, additional steps may be added, and any of the steps may be performed in a parallel and/or partially overlapping manner.

FIG. 3 shows a flowchart of a method in accordance with one or more embodiments of the invention. The method depicted in FIG. 3 may be used to attach an assembly to a target in accordance with one or more embodiments of the invention. The method shown in FIG. 3 may be performed by, for example, an attachment system (e.g., 100, FIG. 1.1).

In step 300, an attachment element is permanently attached to a target.

In one or more embodiments of the invention, the attachment element is permanently attached to the target via an adhesive portion of the attachment element. The attachment element may be a portion of the attachment system.

In one or more embodiments of the invention, the target is a stopper. The stopper may be a portion of a fluid handling system. The fluid handling system may be, for example, a washbasin, shower, or other household fluid handling system.

In step 302, receiver is reversibly attached to the attachment element.

In one or more embodiments of the invention, the receiver is reversibly attached to the attachment element using a magnet. The magnet may be a portion of the receiver.

In one or more embodiments of the invention, the receiver is part of the attachment system.

In step 304, an assembly is attached to the receiver.

In one or more embodiments of the invention, the assembly is a knob. The knob may include a through hole.

In one or more embodiments of the invention, the knob is attached to the receiver by detaching a portion of the receiver, threading the remaining portion of the receiver through the hole in the knob, and reattaching the portion of the receiver. When the portion of the receiver is reattached, interference between the receiver and the assembly may be generated. Generating interference may lock the assembly to the receiver and, in turn, the attachment system.

In step 306, a portion of the attachment system is detached from the target.

In one or more embodiments of the invention, the portion includes the receiver. Consequently, the assembly is also detached from the target.

In one or more embodiments of the invention, the remaining portion of the attachment system remains attached to the target while the assembly is detached.

In one or more embodiments of the invention, the portion of the attachment system is detached by applying physical force to the portion sufficient to overcome the magnetic attraction between the magnet and the remaining portion of the attachment system that is attached to the target.

The method may end following step 306.

One or more embodiments of the invention may improve the field of attachment technology in challenging environments. Specifically, embodiments of the invention may provide a system for reversibly attaching an assembly to surface having a complex shape that may be contaminated with fluids. To address this challenging environment, attachment system in accordance with embodiments of the invention may permanently attach a portion of the attachment system to the target. The permanently attached portion of the attachment system may facilitate reversible attachment of the remaining portion of the attachment system.

For example, a portion of the attachment system permanently attached to a target may include a material susceptible to magnetization that may be used to reversibly attach the remaining portion of the attachment system via magnetic force. By doing so, embodiments of the invention may reduce the potential for attachment failure due to surface contamination of the target. While described as being reversibly attached via magnet force, other forces may be utilized to reversibly attach different portions of the attachment system without departing from the invention. For example, mechanical interference, chemical forces, or other types of forces may be utilized to reversibly attach different portions of the attachment system.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. An attachment system for attaching an assembly to a target, comprising:
    an attachment element adapted to attach to the target; and
    a receiver adapted to attach the assembly to the attachment system,
    wherein at least a portion of the attachment system is reversibly detachable from the target when the attachment system is attached to the target,
    wherein the attachment element comprises an adhesive surface adapted to permanently attach the attachment element to the target.

2. The attachment system of claim 1, wherein the attachment element is adapted to permanently attach to the target.

3. The attachment system of claim 2, wherein the attachment element comprises:
    a target mating surface adapted to adhere to the target when the attachment element is attached to the target; and
    a receiver mating surface adapted to reversibly attach to the receiver.

4. The attachment system of claim 3, wherein the receiver mating surface comprises a recess adapted to receive a receiver attachment member.

5. The attachment system of claim 4, wherein the receiver attachment member comprises a magnet.

6. The attachment system of claim 3, wherein the target mating surface has a shape complimentary to a shape of a surface of the target.

7. The attachment system of claim 3, wherein the target mating surface has a shape of a spherical cap.

8. The attachment system of claim 3, wherein the target mating surface is adapted to conform to a surface of the target when the attachment element is attached to the target.

9. The attachment system of claim 3, wherein the attachment element further comprises a target attachment member that facilitates attachment of the target mating surface to the target, wherein the target attachment member is made from an adhesive material.

10. The attachment system of claim 1, wherein the attachment element comprises a body formed from magnetic material, wherein the magnetic material enables the body to reversibly attach to the target.

11. The attachment system of claim 1, wherein the target is a surface having a spherical cap shape.

12. The attachment system of claim 1, wherein the receiver comprises:
    an assembly mating body adapted to lock the assembly to the assembly mating body,
    wherein the assembly mating body comprises a locking body and a receiving body both adapted to reversibly attach to one another using physical features that generate frictional forces there-between,
    wherein the assembly is disposed on one selected from a group consisting of the locking body and the receiving body.

13. The attachment system of claim 12, wherein locking the assembly to the receiver prevents the assembly from being pulled away from the receiver by a physical force.

14. The attachment system of claim 12, wherein the locking body comprises an assembly interference representing a physical feature that prevents the assembly from rotating with respect to the attachment system.

15. The attachment system of claim 1, wherein the assembly is restricted from being pulled away from the target by a physical force when the assembly is attached to the target by the attachment system.

16. The attachment system of claim 1, wherein the assembly is restricted from rotating with respect to the target when attached to the target by the attachment system.

17. The attachment system of claim 1, wherein the at least the portion of the attachment system comprises the receiver.

18. The attachment system of claim 1, wherein the assembly is oriented in a predetermined direction by the attachment system when the assembly is attached to the target by the attachment system.

* * * * *